(No Model.)
W. L. PIKE.
ROAD CART.
No. 469,090.  Patented Feb. 16, 1892.
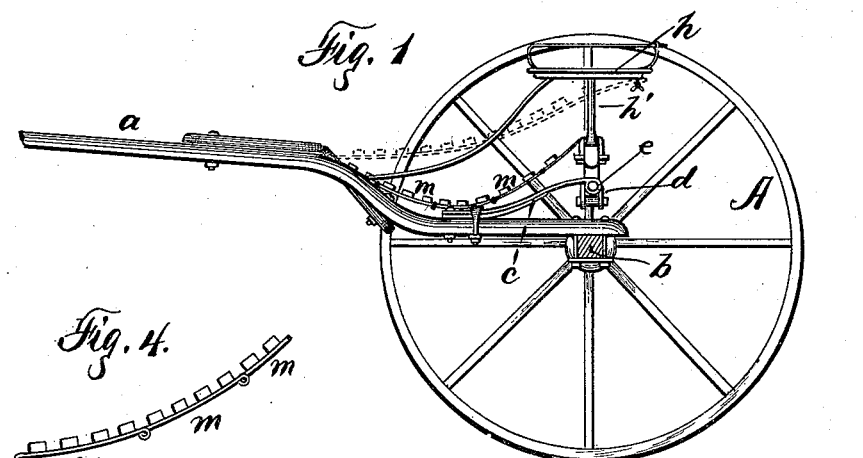
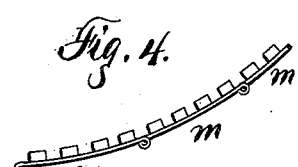
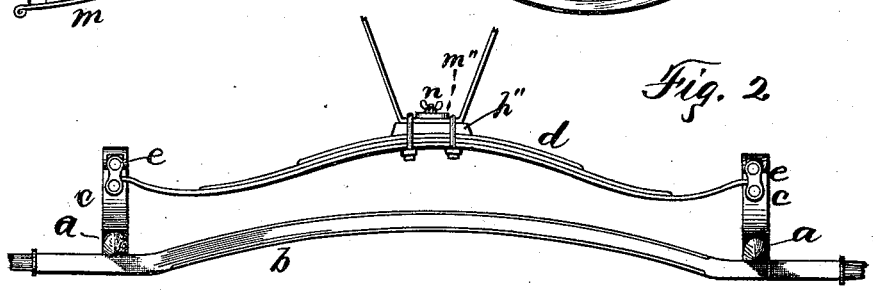
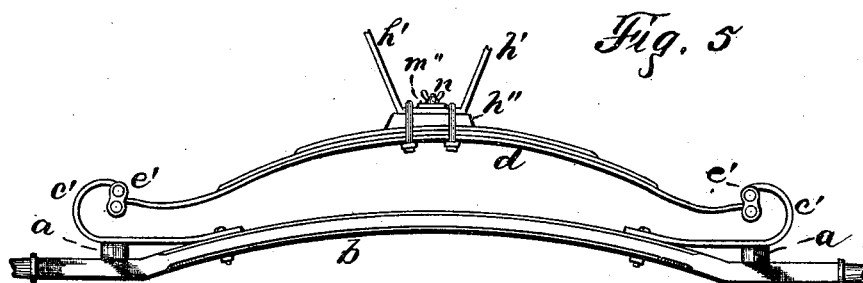
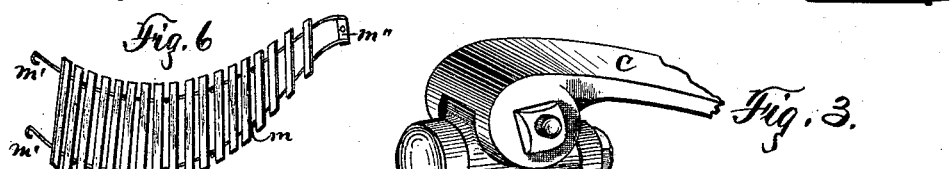
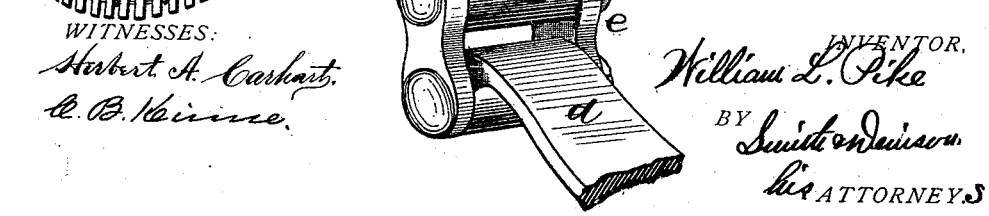
WITNESSES:
Herbert A. Carhart.
C. B. Kinne.
INVENTOR,
William L. Pike
BY Smith & Davison
his ATTORNEYS

UNITED STATES PATENT OFFICE.

WILLIAM L. PIKE, OF GROTON, NEW YORK.

ROAD-CART.

SPECIFICATION forming part of Letters Patent No. 469,090, dated February 16, 1892.

Application filed August 22, 1891. Serial No. 403,435. (No model.)

*To all whom it may concern:*

Be it known that I, WILLIAM L. PIKE, of Groton, in the county of Tompkins, in the State of New York, have invented new and useful Improvements in Road-Carts, of which the following, taken in connection with the accompanying drawings, is a full, clear, and exact description.

My invention relates to that class of vehicles commonly known as "road-carts."

My object is to produce an improved two-wheeled vehicle in which provision is made for taking up the horse motion by connecting the main load-carrying spring located above the axle to auxiliary springs secured to the thills or axle, and having their upper ends standing above said thills or axle at the point of connection to said main spring, and also in which the foot-board is flexible and adjustable.

My invention consists in the several novel features of construction and operation hereinafter described, and which are specifically set forth in the claim hereunto annexed. It is constructed as follows, reference being had to the accompanying drawings, in which—

Figure 1 is a side elevation of the vehicle with one wheel removed. Fig. 2 is a rear elevation of the same with both wheels removed. Fig. 3 is a perspective of the shackle connection between the main and auxiliary springs. Fig. 4 is a side or edge view of part of the foot-board. Fig. 5 is a rear elevation of the vehicle without wheels, in which the auxiliary springs are secured upon the axle.

A is one of the wheels, and $a$ $a$ are the thills, secured to the axle $b$ in the ordinary manner. Auxiliary springs $c$ are secured at one end to the thills, Figs. 1 and 2, and project above them and the axle, and the main load-carrying spring $d$ is connected at its end at a right angle to the spring $c$ and is suspended between them by means of the compound shackle $e$, constructed substantially as shown in Fig. 3. A seat $h$ is mounted upon a bar $h'$ of somewhat U form, and which is secured upon the spring-block $h''$ in any ordinary manner.

The foot-board consists of the sectional longitudinal bars $m$, hinged together and provided with hooks $m'$ upon their front ends, adapted to engage with eyes upon the cross-bar between the thills, (not shown,) and are connected together at their rear ends by a cross-bar $m''$, provided with a central bolt-hole, and the slats are secured to the bars in any ordinary manner. A bolt projects above the spring-block $h''$, passing through the bar $m''$ of the foot-board, and a thumb-screw $n$ upon said bolt detachably secures the rear end of said foot-board.

As shown by the dotted lines, the foot-board may be adjusted by securing its rear end to the seat by means of a bolt projecting downward from the seat and a thumb-screw holding the bar $m''$ thereon. It can also be otherwise adjusted by varying the point of the rear connection.

In Fig. 5 I show auxiliary springs $c'$, secured at their inner ends to the axle and their outer ends bent substantially as shown and connected to the main spring $d$ by means of single shackles $e'$.

It will be seen that the load is carried and the horse motion taken up by the joint or compound action of the springs $c$ (or $c'$) and $d$.

What I claim as my invention, and desire to secure by Letters Patent, is—

In a two-wheeled vehicle, a flexible and adjustable foot-board consisting of longitudinal sectional bars hinged together and slats secured thereon, said foot-board being loosely and detachably secured to the seat and to a point below the seat, respectively, for the purpose of raising and lowering the plane of the said foot-rest.

In witness whereof I have hereunto set my hand this 13th day of August, 1891.

WILLIAM L. PIKE.

In presence of—
THOS. F. FITZ PATRICK,
E. A. MARSH.